United States Patent

Ohara

[11] Patent Number: 5,307,102
[45] Date of Patent: Apr. 26, 1994

[54] DRIVING MECHANISM OF CAMERA

[75] Inventor: Tsunemasa Ohara, Tokyo, Japan

[73] Assignee: Canon Kabushiki Kaisha, Tokyo, Japan

[21] Appl. No.: 997,841

[22] Filed: Dec. 29, 1992

[30] Foreign Application Priority Data

Jan. 8, 1992 [JP] Japan ................... 4-001755

[51] Int. Cl.[5] ............................................. G03B 1/12
[52] U.S. Cl. ................................................ 354/173.1
[58] Field of Search ...................... 354/173.1, 173.11

[56] References Cited

U.S. PATENT DOCUMENTS

| | | | |
|---|---|---|---|
| 4,728,975 | 3/1988 | Ohara et al. | 354/173.1 |
| 4,881,092 | 11/1989 | Fukahori et al. | 354/173.1 X |
| 4,967,216 | 10/1990 | Nishio et al. | 354/173.1 |
| 4,969,000 | 11/1990 | Ohara et al. | 354/173.1 |
| 5,025,277 | 6/1991 | Inoue et al. | 354/173.1 |
| 5,049,909 | 9/1991 | Ishikawa et al. | 354/173.1 |
| 5,070,349 | 12/1991 | Haraguchi et al. | 354/173.11 |
| 5,168,295 | 12/1992 | Yoshihara et al. | 354/173.1 |

Primary Examiner—David M. Gray
Assistant Examiner—Jae N. Noh
Attorney, Agent, or Firm—Fitzpatrick, Cella, Harper & Scinto

[57] ABSTRACT

A camera includes a first motor, a second motor which differs in driving characteristic from the first motor, a first transmission mechanism arranged to transmit a rotation output in a first direction of the first motor to a driving system for film winding, a second transmission mechanism arranged to transmit a rotation output in a first direction of the second motor to another driving system for taking shots, and a changeover mechanism arranged to switch the transmission of a rotation output in a second direction of the first motor selectively to a driving system for film rewinding or to the other driving system on the basis of a rotation output in a second direction of the second motor.

18 Claims, 1 Drawing Sheet

DRIVING MECHANISM OF CAMERA

BACKGROUND OF THE INVENTION

1. Field of the Invention

This invention relates to a mechanism for transmitting and switching the driving power of a motor used for a camera.

2. Description of the Related Art

Cameras of the kind performing film winding and shutter charging by means of a built-in motor are known. Generally, an electromagnetic motor is employed as a drive source for cameras of this kind. However, a vibration motor such as an ultrasonic motor, (hereinafter abbreviated to USM), has recently come to be employed as a drive source for a camera.

These motors have their own characteristics. The electromagnetic motor gives a high output despite its compact size. The electromagnetic motor, however, makes a loud operating sound because of its high speed rotation. In the case of the USM, the motor makes no operating sound and gives a high torque with its low speed rotation. Thus, an advantage of the USM lies in that the rotating speed of gears of a driving power transmission system connected to the motor is also low, so that the operating sound of the whole driving system of the camera including the motor can be greatly reduced. The USM, however, requires a higher driving voltage than the electromagnetic motor and thus necessitates increased battery voltage. Hence, in terms of efficiency as a drive source, the USM is inferior to the electromagnetic motor. It is, therefore, not easy to obtain a high output from the use of the USM.

In view of the difference in characteristics. between these motors, it has been common practice to use the electromagnetic motor for a high-performance camera equipped with a high speed shutter having shutter speed as 1/8000 sec. and arranged to perform such speed film winding high as up to five frames of film per second, and to use the USM for a camera which silently operates.

However, in accordance with the conventional arrangement, a high-performance camera inevitably makes a loud operating sound. Also, it has previously not been possible to arrange a silent camera capable of winding up to five frames per second with a high speed shutter having a maximum shutter speed of 1/8000 sec.

SUMMARY OF THE INVENTION

It is, therefore, an object of this invention to provide a camera with a driving mechanism which is arranged to selectively use two motors of different characteristics by switching the use of them from one over to the other and thus permit selection of a high speed driving mode or a silent driving mode.

The above, as well as other objects and features of the invention, will become apparent from the following detailed description of a preferred embodiment taken thereof in connection with an accompanying drawing.

DETAILED DESCRIPTION OF THE PREFERRED EMBODIMENT

Figure 1:
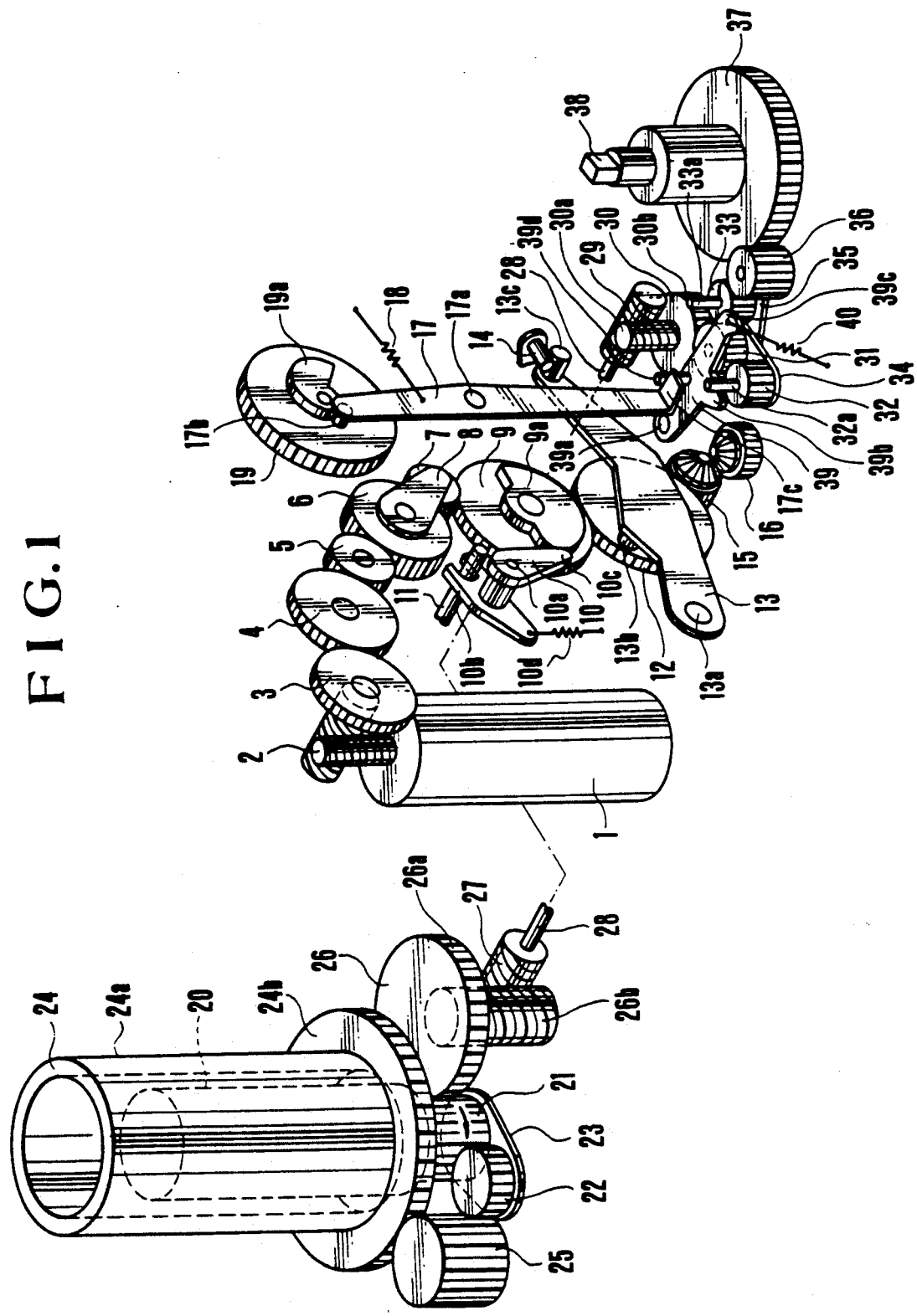
FIG. 1 is an oblique view showing the driving mechanism of a camera embodying this invention.

FIG. 1 shows the structural arrangement of the driving mechanism of a camera arranged as an embodiment of this invention. The driving mechanism is described with reference to FIG. 1 as follows: An electromagntic motor 1 is arranged to be used for charging a shutter, for driving a mirror and for effecting changeover of power. A first gear 2 which is a worm gear is attached to the output shaft of the motor 1. A double gear 3 is arranged to rotate by engaging the first gear 2. The pinion part of the double gear 3 engages the first gear 2 is in the shape of a helical gear. Idle gears 4 and 5 are provided for transmission of rotation. A sun gear 6 is provided for a planetary clutch arrangement to effect changeover of transmission of the rotating power of the motor 1. A planet gear 7 is arranged revolve around the sun gear 6 by a planet arm 8. A mirror driving cam gear 9 has a cam part 9a . A mirror driving arm 10 is arranged to be swingable on a shaft part 10a . The mirror driving arm 10 has a fork part 10b and a cam follower part 10c and is urged by a spring 10d to turn counter-clockwise. The fork part 10b is arranged to engage a mirror driving pin 11 which is a part of a main mirror (not shown). The cam follower part 10c is arranged to abut on the cam part 9a.

A shutter charge cam gear 12 engages the mirror driving cam gear 9 and has a cam part, which is not shown. A shutter charge lever 13 is pivotally carried by a shaft 13a and has a roller part 13b which abuts on the cam of the shutter charge cam gear 12 and a pushing roller part 13c which pushes a driving lever 14 of a shutter unit (not shown). The shutter unit is arranged to be charged by pushing the driving lever 14 upward and to be charged out by moving back the driving lever 14 downward. Gears 15 and 16 are for power transmission, each having a spur gear part and a bevel gear part. The spur gear part of the gear 15 engages the shutter charge cam gear 12 while the bevel gear part of the gear 15 engages the bevel gear part of the gear 16.

A driving power changeover lever 17 is pivotally carried by a support shaft 17a and has a roller part 17b and an engaging part 17c disposed at its two ends. A spring 18 is arranged to exert a clockwise rotating force on the driving power changeover lever 17. A changeover cam gear 19 which has a cam part 19a is arranged to actuate the changeover lever 17.

A motor 20 is provided for film winding and rewinding and for driving the shutter charging mechanism. The motor 20 is an ultrasonic motor. A gear 21 is attached to the motor 20 to act as an output gear. With the gear 21 serving as a sun gear, a planet gear 22 is arranged to revolve around the gear 21. The plant gear 22 is carried by a planet arm 23. A film take-up spool 24 has a gear part 24b which is arranged integrally with a film take-up part 24a . A spool transmission gear 25 constantly engages the gear part 24b and is arranged to be capable of engaging the planet gear 22.

A transmission gear 26 has a spur gear part 26a and a worm part 26b . The spur gear part 26a is disposed in a position to be capable of engaging the planet gear 22. A helical gear 27 engages the worm part 26b and is arranged to rotate together with a shaft 28.

A worm gear 29 is arranged to rotate together with the shaft 28 and also to engage the pinion 30a of a double gear 30. The double gear 30 consists of a spur gear part 30b and the pinion 30a . The pinion 30a is in the shape of a helical gear. A sun gear 31 is provided for a planetary clutch which is arranged to switch the driving power of the motor 20. The sun gear 31 engages the spur gear part 30b of the gear 30 and also engages planet gears 32 and 33. The planet gears 32 and 33 are carried respectively by planet arms 34 and 35 in such a way as to be revolvable around the sun gear 31. A transmission gear 36 is disposed in a position to engage the planet gear 33 when the planet gear 33 revolves clockwise, and constantly engages a fork gear 37. A film rewinding fork 38 is arranged coaxially with the fork gear 37.

A planet changeover lever 39 is swingably carried by a shaft 39a and is urged to turn clockwise by a spring 40. The planet changeover lever 39 has engaging parts 39b and 39c. The engaging part 39b is arranged to abut on the shaft 32a of the planet gear 32, and the engaging part 39c is arranged to abut on the shaft part 33a of the planet gear 33. The revolution of the planet gears 32 and 33 is arranged to be controlled by the position of the planet changeover lever 39. A driving pin 39d is erected on the planet changeover lever 39 and arranged to engage the engaging part 17c of the driving power changeover lever 17. With the driving pin 39d engaging the engaging part 17c, the planet changeover lever 39 is swung when the driving power changeover lever 17 swings.

The embodiment which is arranged in this manner operates as follows: FIG. 1 shows the embodiment in a condition obtained after the completion of preparation of the camera for an exposure. When a shutter release button is operated under this condition, the motor 1 rotates counterclockwise for moving a mirror upward prior to a release of the shutter. In accordance with the rotation of the motor 1, the double gear 3, the idle gears 4 and 5 and the sun gear 6 rotate. The rotation of the sun gear 6 causes the planet gear 7 to revolve clockwise around the sun gear 6. The planet gear 7 thus comes to engage the mirror driving cam gear 9 and transmits the driving power of the motor 1 to the mirror driving cam gear 9 and the shutter charge cam gear 12 to rotate them.

With the mirror driving cam gear 9 thus caused to rotate clockwise, the follower part 10c of the mirror driving arm 10 disengages from the cam top of the cam part 9a of the cam gear 9. The mirror driving arm 10 then turns counterclockwise. This causes the mirror driving pin 11 to spring up to move the mirror upward. At this time, the shutter charge cam gear 12 is also rotated to disengage the roller part 13c of the shutter charge lever 13 from a cam top part which is not shown. The shutter charge lever 13 is thus caused to turn clockwise by the shutter driving lever 14 to charge out the shutter.

Since the mirror is moved upward and the shutter driving lever 14 is brought back to a charged-out state through the above-stated processes, a shutter release becomes possible. After the shutter release, when a current is applied to the motor 1 in such a way as to cause the motor 1 to rotate in the same direction (i.e., counterclockwise), the mirror driving cam gear 9 and the shutter charge cam gear 12 are caused to rotate through the gear train 2, 3, 4, 5, 6 and 7. The mirror is caused to move downward through the mirror driving arm 10. The shutter is charged by causing the shutter charge lever 13 to turn counterclockwise. The driving mechanism then comes back to the condition as shown in FIG. 1.

Further, at this time, a current is applied to the ultrasonic motor 20 in such a way as to rotate the gear 21 in the direction of a shown arrow. The rotation of the gear 21 then causes one frame of the film to be taken up by rotating the gear part 24b of the spool 24 through the planet gear 22 and the transmission gear 25.

In rewinding the film after taking shots for all frames, the motor 20 is caused to rotate in a reverse direction. The gear 21 then rotates in a direction reverse to the direction of the arrow to engage the gear 26. The gear 30 is caused to rotate counterclockwise through the gears 26 and 27, the shaft 28 and the gear 29. The sun gear 31 rotates clockwise. The planet gears 32 and 33 then respectively try to revolve clockwise. However, the shaft 32a of the planet gear 32 then comes to abut on the engaging part 39b of the planet changeover lever 39 to prevent further revolution of the planet gear 32. The planet gear 32 is thus allowed only to rotate without engaging the gear 16.

Meanwhile, the other planet gear 33 revolves to engage the transmission gear 36. As a result, the rotating power of the motor 20 is transmitted only to the fork gear 37 to cause the film to be rewound into a film cartridge by the fork 38.

The above description of the operation applies to a case where the invented arrangement functions as the so-called two-motor driving system. In this case, the motor 1 which is an electromagnetic motor 1 and the motor 20 which is an ultrasonic motor can be simultaneously driven to permit a high speed operation in preparing the camera for an exposure and in film winding.

In a case where the film winding and exposure preparing actions are to be carried out in a silent driving mode (without any operation noise) by effecting changeover of driving power, the embodiment operates as follows: In order to change the driving power transmission system from the condition shown in FIG. 1, the motor 1 is first caused to rotate clockwise. The clockwise rotation of the motor 1 then causes the sun gear 6 to rotate counterclockwise through the gears 3, 4 and 5. The planet gear 7 then revolves also counterclockwise to engage the changeover cam gear 19 and causes it to rotate.

When the changeover cam gear 19 is thus caused to rotate counterclockwise, the cam part 19a of the cam gear 19 pushes the roller part 17b of the changeover lever 17 to the left to cause the changeover lever 17 to turn counterclockwise against the force of the spring 18. With the changeover lever 17 caused to turn, the engaging part 17c of the lever 17 pushes the driving pin 39d of the planet changeover lever 39 to cause the lever 39 to turn counterclockwise. Under this condition, the engaging part 39b of the planet changeover lever 39 is retracted outside the revolution locus of the shaft 32a of the planet gear 32a to allow the planet gear 32 to freely revolve. Meanwhile, for the planet gear 33, the engaging part 39c of the planet changeover lever 39 abuts on the shaft 33a of the planet gear 33 to prevent the planet gear 33 from revolving and thus from engaging the transmission gear 36. A driving power changeover action thus comes to an end.

When a shutter release operation is performed under this condition, the motor 20 is first driven to rotate in a direction reverse to the arrow. The sun gear 31 is thus caused to rotate clockwise through the gears 21, 22, 26 and 27, the shaft 28 and the gears 29 and 30. The planet gears 32 and 33 try to revolve. The planet gear 32 is allowed to freely revolve to come to engage the gear 16, as mentioned above. However, the planet gear 33 is prevented from revolving and allowed only to rotate without engaging the transmission gear 36. Therefore, the rotative driving power of the motor 20 is transmitted from the sun gear 31 to the shutter charge cam gear 12 through the planet gear 32 and the gears 16 and 15. After that, a series of actions including the mirror upward-moving, shutter charging-out, shutter releasing, mirror downward-moving and shutter charging is performed in the same manner as the actions performed in the above-stated case of driving the two motors. After completion of the shutter charging action, the motor 20 is driven to rotate in the direction of the arrow for film winding. As described above, in the silent driving mode obtained by the changeover of the driving power, the film winding and exposure preparing actions can be carried out by the normal and reverse rotations of the ultrasonic motor 20.

Since the motor 20 is an ultrasonic motor, it makes no operation sound by itself. Further, since the output gear 21 rotates at a low speed, the driving noise of the whole camera can be minimized. In rewinding the film in the silent driving mode, after completion of taking shots for all frames, the motor 1 is again driven to rotate clockwise. The changeover cam gear 19 is rotated to bring the changeover lever 17 and the planet changeover lever 39 back to the state shown in FIG. 1. Then, the rotative driving power of the motor 20 can be transmitted to the fork gear 37.

In accordance with the arrangement of the embodiment described, a driving mechanism of a camera of the kind having two built-in motors can be provided with means for automatically changing the motor driving power transmission route from one route over to another. This changeover means enables the driving mechanism to operate selectively in the first and second operation modes for film winding and exposure preparing actions. In the first mode, the film winding and exposure preparing actions can be carried out by the normal and reverse rotations of only one of the two motors. In the second mode, the film winding and exposure preparing actions can be carried out by simultaneously using the driving powers of the two motors. Further, one of the motors to be used in the first mode is arranged to be an ultrasonic motor while the other is arranged to be an electromagnetic motor. This arrangement permits the camera to silently operate in the first mode and to operate at a high speed in the second mode.

What is claimed is:

1. A camera comprising
a) a first motor;
b) a second motor which differs in driving characteristic from said first motor;
c) a first transmission mechanism arranged to transmit a rotation output in a first direction of said first motor to a driving system for film winding;
d) a second transmission mechanism arranged to transmit a rotation output in a first direction of said second motor to another driving system for taking shots; and
e) a changeover mechanism arranged to switch the transmission of a rotation output in a second direction of said first motor selectively to a driving system for film rewinding or to said another driving system on a basis of a rotation output in a second direction of said second motor.

2. A camera according to claim 1, wherein said first and second motors are disposed within a camera body.

3. A camera according to claim 1, wherein a vibratory driving motor is employed as said first motor and an electromagnetic motor is employed as said second motor.

4. A camera according to claim 1, wherein said another driving system is a shutter charge driving system.

5. A camera according to claim 1, wherein said another driving system is a mirror driving system.

6. A camera according to claim 1, wherein said another driving system is arranged to perform both a shutter charging action and a mirror swinging action.

7. A camera according to claim 1, wherein a first planetary clutch is employed as said first transmission mechanism and a second planetary clutch is employed as said second transmission mechanism.

8. A camera according to claim 2, wherein a vibratory driving motor is employed as said first motor and an electromagnetic motor is employed as said second motor.

9. A camera according to claim 2, wherein said another driving system is a shutter charge driving system.

10. A camera according to claim 2, wherein said another driving system is a mirror driving system.

11. A camera according to claim 2, wherein said another driving system is arranged to perform both a shutter charging action and a mirror swinging action.

12. A camera comprising
a) a first motor disposed within a camera body;
b) a second motor which differs in driving characteristic from said first motor and which is disposed within said camera body;
c) a first transmission mechanism arranged to transmit a rotation output in a first direction of said first motor to a first driving system;
d) a second transmission mechanism arranged to transmit a rotation output in a first direction of said second motor to a second driving system; and
e) a changeover mechanism arranged to switch the transmission of a rotation output in a second direction of said first motor selectively to a third driving system or to said second driving system on the basis of a rotation output in a second direction of said second motor.

13. A camera according to claim 12, wherein a vibratory driving motor is employed as said first motor and an electromagnetic motor is employed as said second motor.

14. A camera according to claim 12, wherein said first driving system is arranged to advance a film in a first direction and said third driving system is arranged to advance the film in a second direction.

15. A camera according to claim 14, wherein said second driving system is a shutter charge driving system.

16. A camera according to claim 14, wherein said second driving system is a mirror driving system.

17. A camera according to claim 12, wherein a first planetary clutch is employed as said first transmission mechanism and a second planetary clutch is employed as said second transmission mechanism.

18. A camera according to claim 14, wherein a first planetary clutch is employed as said first transmission mechanism and a second planetary clutch is employed as said second transmission mechanism.

* * * * *

UNITED STATES PATENT AND TRADEMARK OFFICE
CERTIFICATE OF CORRECTION

PATENT NO. : 5,307,102
DATED : April 26, 1994
INVENTOR(S) : TSUNEMASA OHARA

It is certified that error appears in the above-indentified patent and that said Letters Patent is hereby corrected as shown below:

COLUMN 1:

line 38, "as" should read --as high as--.
line 39, "winding" should read --winding as--.

COLUMN 2:

line 2, "electromagntic" should read --electromagnetic--.
line 9, "is" should read --, which is--.
line 13, "arranged" should read --arranged to--.

COLUMN 5:

line 46, "comprising" should read --comprising:--.

COLUMN 6:

line 27, "comprising" should read --comprising:--.

Signed and Sealed this

Eighteenth Day of October, 1994

Attest:

BRUCE LEHMAN

*Attesting Officer*  *Commissioner of Patents and Trademarks*